US006698200B1

(12) United States Patent
Rauen

(10) Patent No.: US 6,698,200 B1
(45) Date of Patent: Mar. 2, 2004

(54) EFFICIENCY THERMODYNAMIC ENGINE

(75) Inventor: Kenneth M. Rauen, Concord, NH (US)

(73) Assignee: Cool Engines, Inc., Concord, NH (US)

( * ) Notice: Subject to any disclaimer, the term of this patent is extended or adjusted under 35 U.S.C. 154(b) by 289 days.

(21) Appl. No.: 09/853,307

(22) Filed: May 11, 2001

(51) Int. Cl.[7] ................................................ F01B 29/10
(52) U.S. Cl. ........................................ 60/520; 60/526
(58) Field of Search ........................... 60/517, 520, 526

(56) References Cited

U.S. PATENT DOCUMENTS

| | | | | | |
|---|---|---|---|---|---|
| 3,698,182 A | * | 10/1972 | Knoos | ........................ | 60/522 |
| 3,812,682 A | * | 5/1974 | Johnson | ............................ | 62/6 |
| 3,978,680 A | * | 9/1976 | Schukey | ............................ | 62/6 |
| 3,996,745 A | * | 12/1976 | Davoud et al. | ................ | 60/517 |
| 4,630,447 A | * | 12/1986 | Webber | ........................ | 60/712 |

* cited by examiner

Primary Examiner—Hoang Nguyen
(74) Attorney, Agent, or Firm—Stephen G. Matzuk

(57) ABSTRACT

A novel thermodynamic engines including a piston operating on a compressible fluid in a thermally insulated volume, which also includes a movable displacer which selectively divides the internal volume between a warm and a cold side, and a regenerator through which the fluid from the selectively divided volume passes and transfer its heat to or receives heat from, wherein the piston and displacer are each periodically moved in various complex motions according to the present invention to provide efficiency higher than Carnot efficiency. The resulting novel structures and methods, generally referred to as "Superclassical Cycle" engines, incorporate constant volume cooling and aspects of the "Proell Effect" (relative to cooling) to achieve improved efficiencies wherein the gas temperature on the cold side of a fluid displacer is below the lowest regenerator temperature due to "self-refrigeration." Thus according to the apparatus and methods according to the present invention, the traditional principals of the Second Law is further refined and higher operating efficiencies achieved.

36 Claims, 16 Drawing Sheets

EFFICIENCY THERMODYNAMIC ENGINE

FIELD OF THE INVENTION

The present invention relates to thermodynamic heat engines, in particular to improved efficiency thermodynamic heat engines of at least three cycle steps.

BACKGROUND OF THE INVENTION

Prior thermodynamic engines of the Stirling cycle exchange a fluid that can be heated (or cooled) and compressed (or expanded) and have at least two different volumes or segregated portions or regions of a common volume in which the fluid is contained and moved. Typically, the fluid is generally heated to a first temperature T1 by a temperature source, cooled to a lower temperature T2 by a temperature sink and mechanical work extracted as a result of the displacement and expansion and compression of the fluid as it is cyclically exposed to the temperature source and sink. Notably, most of the heat received from the source is transferred to the sink, with a small portion (about 30%) being inefficiently converted to mechanical energy in a typical, good heat engine.

An exemplary reference Stirling cycle engine 50 is shown in FIG. 1 as a power piston and displacer system, with piston motion controlled by cam surfaces on the flywheel, but alternative methods of piston motion control may be incorporated by the Stirling cycle engine. As shown in FIG. 1, a volume contains the fluid (e.g. air) within a vessel 52 having thermal insulation there around. Typically, a displacer comprises a form of a baffle which divides the volume within the vessel 52 into two regions or portions of complementary varying size, specifically, a "cold" end 52 C cooled to temperature T2 as provided by a heat sink 54 to the ambient temperature, and a "warm" (or heated) end 52W heated by source 56 to temperature T1. The displacer is fitted within the vessel sufficiently completely so that fluid moves between the warm and cold regions substantially entirely via a regenerator 58 which is disposed in and moved with the displacer 60 within the volume 52 by the displacer 60 and rod 62. For simplicity, the piston and displacer rods in the exemplary embodiment of FIG. 1 are coaxial. That is, the displacer rod goes through the piston rod and the displacer rod goes over the flywheel axle (71 in FIG. 1.), which can be stationary and have a bearing interfacing with the flywheel 70. In this case, the axle or its assembly may be penetrated by the displacer rod. Alternate flywheel arrangements are possible in which the cam tracks do not cross and can be placed on opposite sides of the flywheel.

Mechanical energy output is provided by 'power' piston 64 which in this embodiment, also incorporates a heat conductive material and the heat sink 54 attached thereto. The mechanical energy from the power piston is transferred to a flywheel 70 via connecting rod 74 and cam track 68, connected to or part of (together with the displacer cam track 72) the flywheel 70.

Stirling Cycle engines include constant volume processes (e.g. 84A and 88A) and constant temperature processes (e.g. 82B and 86B) cycles, as illustrated by the graphs 80A and 80B of FIGS. 2A and 2B, respectively. Also typically, as in other embodiments of the Stirling ling Cycle engine, the cyclical power piston and displacer motions of the embodiment of FIG. 1 are generally identical in sinusoidal motion, but offset by 90°. The typical piston and displacer positions-versus-time over the cycle reference points A–D (also in graphs 80A and 80B) are illustrated by respective segments 92P, 94P, 96P, 98P and 92D, 94D, 96D, 98D in the graph 90 of FIG. 2C.

SUMMARY OF THE INVENTION

The novel thermodynamic heat engines according to the present invention provide efficiencies higher than Carnot efficiency. In the present inventions, generally referred to as "Superclassical Cycle" engines, constant volume cooling with displacement and regeneration, and aspects of the "Proell Effect" (relative to cooling) are utilized. Moreover, the gas temperature on the cold side of a fluid displacer is below the lowest regenerator temperature due to "self-refrigeration."

The "Proell Effect" (as described in The Thermodynamic Theory and Engineering Design of Supercarnot Heat Engines, by Wayne Proell, Cloud Hill Press, Las Vegas, N.Mex., 1984) incorporated by reference, refers to thermodynamic heat engine cycles and includes previous behavior of all gases in constant volume conditions with regeneration. The Proell Effect, by itself, conforms to the most rigorous definition of the Second Law of Thermodynamics which calls for zero or greater than zero entropy increases in isolated energy systems. However, the Proell Effect is unrecognized, unpredicted and not fully explored for traditional analyses of constant volume processes, such as in the Stirling cycle engines. The Proell Effect is not seem in the Stirling cycle because of the summetry created by two constant volume processes of opposite direction of fluid flow which cancels the Proell Effect.

Conventional thermodynamics identifies only one behavior of gases in a constant volume process, that is a change in internal energy directly proportional to its temperature, which equates to the heat added or removed, as its heat capacity at constant volume, $C_V$, times the temperature change experienced, $$Q = C_V(\Delta T) \tag{1}$$

In addition to a description of gas behavior at constant volume as described by Equation 1, above, the constant volume environment and its energy flows become more complex when the constant volume is not at a uniform temperature and is divided by a displacer and the subdivided volumes are connected via a regenerator as illustrated by the engine 50 of FIG. 1.

Further understanding may be provided by the Proell Effect, wherein the fluid is exemplified by a gas. In a constant volume process with regeneration, the change in volume of a gas displaced through a regenerator as a result of its change in temperature going from the hot side (T1) of a constant volume to the cold side (T2) of a constant volume, or vice-versa, the gas being separated in the constant volume and displaced from said hot and cold sides through a regenerator by a displacer, must be compensated by an equal and opposite volume change in the remainder of the gas not in the regenerator, in the hot and cold sides of said constant volume. The corresponding pressure-volume work energies involved with all localized volume changes within the constant volume transfer thermal energy between said regenerator and the gas of the hot and cold sides of the constant volume. This results in a temperature change experienced by the gas under adiabatic conditions in the hot and cold sides of the constant volume which will be greater than the temperature difference of said regenerator, up to a limit proportional to said gas' heat capacity ratio, gamma. The pressure-volume work transfers heat inside the regenerator by heat capacity at constant pressure $C_P$ and transfers heat by heat capacity at constant volume, $C_V$, in said hot and cold sides of the constant volume.

The Proell effect may occur for fluid (gas) flow in either direction through the regenerator. When the gas going through the regenerator is heated, it expands, causing a compensatory compression in the remainder of the gas in the constant volume chamber. When the gas going through the regenerator is cooled, it compresses, causing a compensatory expansion in the remainder of the gas in the constant volume chamber. By normal gas behavior under adiabatic conditions, expansion is accompanied by a drop in temperature and compression is accompanied by a rise in temperature. These temperature changes are in addition to the temperature changes caused by intimate thermal contact with the regenerator while passing through the regenerator.

In the present invention, the final gas temperature on the cold side of the displacer in constant volume cooling is below the lowest regenerator temperature. The magnitude of how far below the conventional constant volume cooling temperature the gas goes depends upon the temperature difference of the regenerator and the degree of displacement. Such cooling beyond the conventionally predicted temperature is referred to as "self-refrigeration."

When displacement from the hot side to the cold side is complete, half of the maximum self-refrigeration is created in the cold side. This is because compensatory cooling occurs in both the hot and cold side portions of the constant volume during the entire constant volume displacement. Summed throughout the entire stroke, the hot and cold sides contribute the same total heat flow and pressure-volume work. As an increment of gas passing through the regenerator cools, by the Ideal Gas Law, its volume decreases in direct proportion to the temperature decrease, $$dV_{increment} = (nR/P_{increment})dT_{regenerator} \quad (2)$$

where n is the number of moles of gas, R is the gas constant, and pressure, P, is variable and incremental because the overall constant volume process will see a pressure decrease as the entire mass of gas is cooled from high to low temperature in a fixed total volume. When the incremental volume of gas going through the regenerator is insignificant relative to the total volume, P is essentially constant for that incremental passage. By this same equation (2), it is seen that as P reduces over the entire constant volume process, incremental V must increase. The pressure-volume work done on the cooling gas is incrementally constant during the entire constant volume stroke. This is supported in conventional thermodynamics; the difference between $C_P$ and $C_V$ is a constant, also called the gas constant, R.

The work contributions made by the hot and cold volumes outside the regenerator are linearly proportioned according to the hot and cold gas volumes which shift throughout the stroke. At the beginning of the constant volume stroke, all of the compensating expansion is provided by the hot side. Half way through the stroke, half of the expansion work comes from the hot side and half from the cold side. At the end of the stroke, all of the work comes from the cold side. Since the incremental compression work is constant throughout the stroke, the cold side self-refrigeration energy is merely half of the total pressure-volume work absorbed by the regenerator. The hot side portion of the gas must pass through the regenerator, giving its thermal condition to the regenerator. That gas leaves the regenerator at the lowest temperature of the regenerator and the self-refrigeration which it obtained on the hot side is no longer present as the gas enters the cold side. That self-refrigeration is stored in the hot side of the regenerator as a slight cooling of the hot entrance of the regenerator, to be fully reversed in the engine's heating stroke.

When the displacement from the hot side to the cold side is partial, and starts with some gas already on the cold side, more than half of the self-refrigeration is on the cold side. This larger self-refrigeration can approach gamma times the conventional constant volume cooling value proportional to $C_V$.

The heat absorbed by the regenerator is, $$Q = C_P(\Delta T_{regen}), \quad (3)$$

as a mass of gas going through the regenerator experiences nearly constant pressure and must absorb the work of compression from its volume decrease. The compression work absorbed is passed on to the regenerator as heat.

Since the gas being cooled in the regenerator can only provide heat to the regenerator at $C_V$, the extra energy of $C_P$ absorbed in the regenerator must come from the remainder of the gas, as mentioned above. This absorption of heat by the regenerator is also termed heat recovery or heat rejection (to the regenerator).

The compression work done inside the regenerator is the difference between $C_P$ and $C_V$:

$$W = (\Delta T_{regen}) C_V (\gamma - 1) \quad (4)$$

$$= P(dV). \quad (4A)$$

The work was provided from the bulk of the gas outside of the regenerator under adiabatic conditions, so the work comes from the internal energy of the gas in the hot and cold zones, $$W = C_V(\Delta T_{sr}). \quad (5)$$

The self refrigeration, $\Delta T_{sr}$, is summarized as follows, $$\Delta T_{sr} = K_P(\Delta T_{regen})(\gamma - 1). \quad (6)$$

For full displacement (proportionality fraction $K_P=0.5$), $$\Delta T_{sr} = 0.5(\Delta T_{regen})(\gamma - 1). \quad (7)$$

For partial displacement, more complicated conditions apply, as reflected by the proportionality fraction. Since only part of the gas confined to constant volume is passed through the regenerator, not as much energy is transferred. Likewise, the amount of self-refrigeration energy removed from the cold side depends upon the proportion of the total gas which is always on the cold side and half of the gas which comes from the hot side, The self refrigeration temperature change becomes, $$\Delta T_{sr} = (\text{min. cold side mass fraction} + 0.5 \text{ hot side mass fraction}) \times (\text{mass fraction transferred})(\Delta T_{regen})(\gamma - 1). \quad (8)$$

If the lowest temperature of the regenerator is room temperature, a constant volume cooling stroke with regeneration will result in the confined gas at a temperature below room temperature. Since this is accomplished by only the displacement of the gas from the hot side to the cold side, this uncommon form of refrigeration takes place at a very low cost to an engine cycle which incorporates it. Under reversible conditions, this refrigeration takes place with no work input, only a perturbation which approaches zero work. Under common, irreversible conditions, the friction and viscous drag of the displacer is very small. This uncommon cooling is applied in the present invention to create an 'internal' heat sink to which all heat flows and is then partially or completely sent to the regenerator over the range of temperatures in the regenerator. When partial displacement is used, the self-refrigeration is greater than what is needed to produce an internal heat sink to capture all compression energy and all friction and all thermal losses. Heat can flow to the internal heat sink from outside the engine, becoming part or all of the heat input to the engine, and a unity efficient engine becomes possible.

This novel engine efficiency is consistent with the Kinetic Theory of Heat, wherein the collisions of moving particles composing matter transfer kinetic energy, which is thermal energy which is never lost; thermal energy is perpetual. When work is created from this thermal energy, all energy leaving the thermal mass can become work. Conventional thermodynamics allows for processes to have complete conversion of heat into work, such as in the isothermal expansion of an ideal gas under reversible conditions; likewise, isentropic expansion is a unity efficient process, producing work from only the internal energy of the working gas. Such work may degrade back to thermal energy. Since work has no temperature, it may be dissipated back to heat at whatever the temperature of the receiving mass is. If this is the same mass which produced the work from thermal energy, the energy flow as heat has occurred with no net entropy increase. Conventional thermodynamics does not preclude this except by the general understanding of the Second Law of Thermodynamics.

Conventional thermodynamics can accommodate the present inventions with the following refinements to the Second Law of Thermodynamics: Work and heat may interchange perpetually, when first, since work has no entropy and may be dissipated as heat at any temperature, an energy system may have more than one equilibrium state, and second, when an engine creates an internal heat sink which is lower in temperature than the surrounding environment, and thus no heat will escape the engine.

Thus according to the apparatus and methods according to the present invention, the traditional Second Law requirement of energy losses in a heat engine is circumvented, and uses the Second Law's fundamental principle, e.g. that heat flows from higher temperature to lower temperature, to advantage.

The more observable distinctions of the method and apparatus of the present invention can be seen in the corresponding individual and relative motions of the piston and the displacer. By contrast with a typical (e.g. Stirling) cycle which have piston (and other mechanism) motions which are a pure sinusoid having a period equal to the cyclical rotation of the engine, the present invention has a more complex piston and/or displacer excursions that move in motions, or motion harmonics, more complex than a pure sinusoid motion. This is most clearly seen in portions of the cycle according to the various embodiments of the present invention discussed below, which include a stationary period. Furthermore, the piston and displacer motions are different motions, not just similar but phase-shifted motions as frequently found in prior art engines.

BRIEF DESCRIPTION OF THE DRAWINGS

These and further features of the present invention will be better understood by reading the following Detailed Description together with the Drawing, wherein.

DETAILED DESCRIPTION OF THE INVENTION

The embodiments discussed below are chosen here for greatest similarity to the above-discussed prior art Stirling Cycle embodiment (FIG. 1) and for simplicity. Refinements made or the incorporation of equivalents by one of ordinary skill in the art are also included within the scope of the present invention. Moreover, the implementations according to the present invention (Superclassical Cycle) incorporate more advanced type of piston control instead of the sinusoidal motion typically used by the Stirling Cycle. Therefore, by utilizing the same exemplary hardware and motion control mechanism, the distinctions of the several implementations of the present invention over the prior art become clear.

Figure 3:
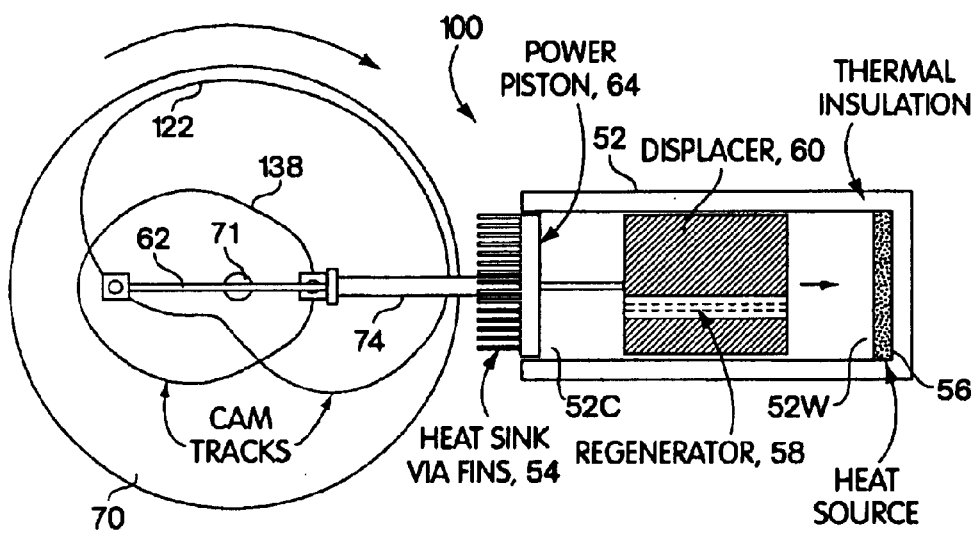
FIG. 3 is a partial cross-section elevation view of a first embodiment thermodynamic engine according to the present invention.

The first exemplary embodiment 100 according to the present invention is shown in FIG. 3, and is composed of isovolumetric, isentropic, and isobaric processes, wherein regeneration between the isovolumetric and isobaric processes recycles more unconverted heat than previously believed possible. The constant volume cooling provided through the regenerator 58 in this embodiment occurs with a greater temperature change in the working fluid than conventionally provided. The Pressure-Enthalpy graph 130B shows point B at a lower temperature than point D, the lowest temperature of the regenerator. The heat rejected from point B to point C on the graphs 130A and 130B is wasted heat and is not recoverable (i.e. by the regenerator). Moreover, the heat recycled in the constant volume portion 132A, of the cycle beyond the temperature of point D to point B, is greater than all previously known regeneration schemes, allowing the Carnot efficiency limit to be exceeded.

Figure 4A:
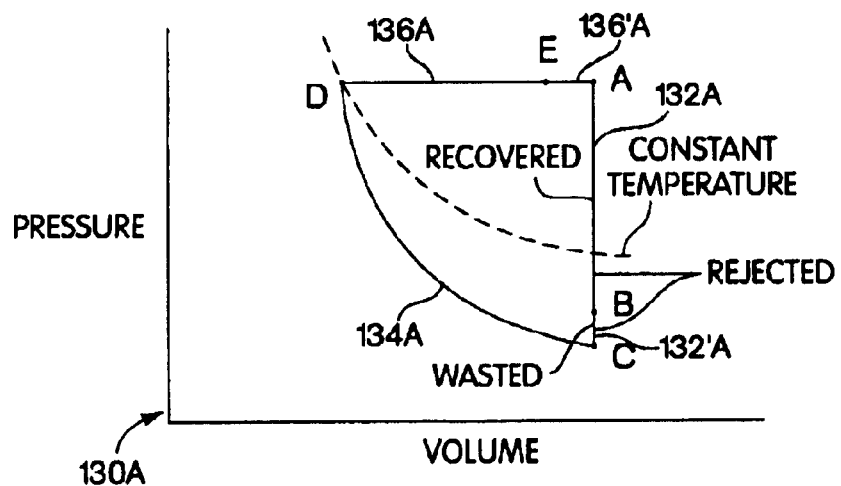
FIGS. 4A and 4B are typical Pressure-Volume and Pressure-Enthalpy graphs of the thermodynamic engine embodiment of FIG. 3.
Figure 4B:
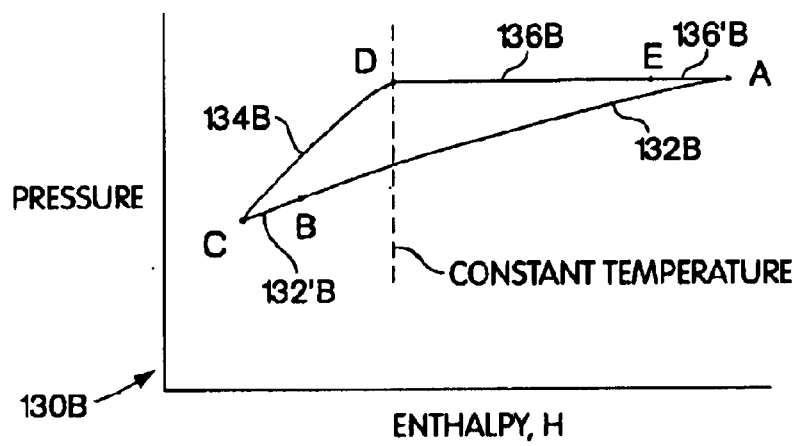
Figure 4C:
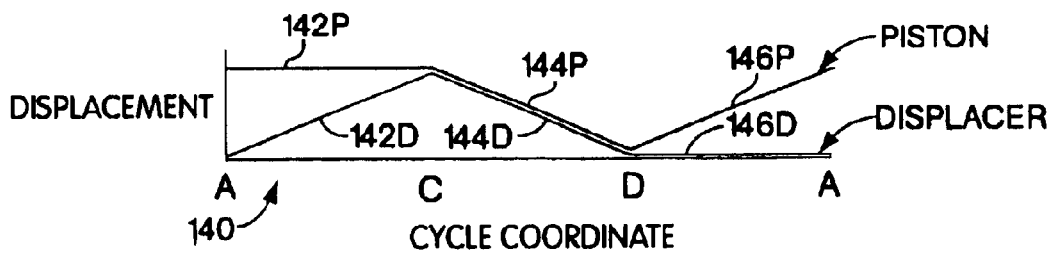
FIG. 4C is a typical Displacement-Time graph of the power piston and fluid displacer cycle motions for the thermodynamic engine embodiment of FIG. 3.

The embodiment 100 of FIG. 3 utilizes complete displacement of the working fluid which results in only half of the extra heat being lifted, according to the Proell Effect as previously stated, by pressure-volume work from the gas at constant volume to the regenerator 58. The displacements of the piston 64 and the displacer 60 over the cycle is shown in graph 140 of FIG. 4C by line segments 142P, 144P, 146P, and 142D, 144D, 146D, respectively. The piston 64 and displacer 60 motions are provided by corresponding cam tracks 138 and 122, respectively.

The Pressure-Volume and Pressure-Enthalpy graphs 130A and 130B corresponding to the embodiment 100 of FIG. 3 demonstrate constant volume cooling by traces 132A and 132'A (also 132B and 132'B), constant entropy (isentropic) compression by trace 134A (also 134B), and constant pressure expansion by curve traces 136A and 136'A (also 136B and 136'B).

Figure 5:
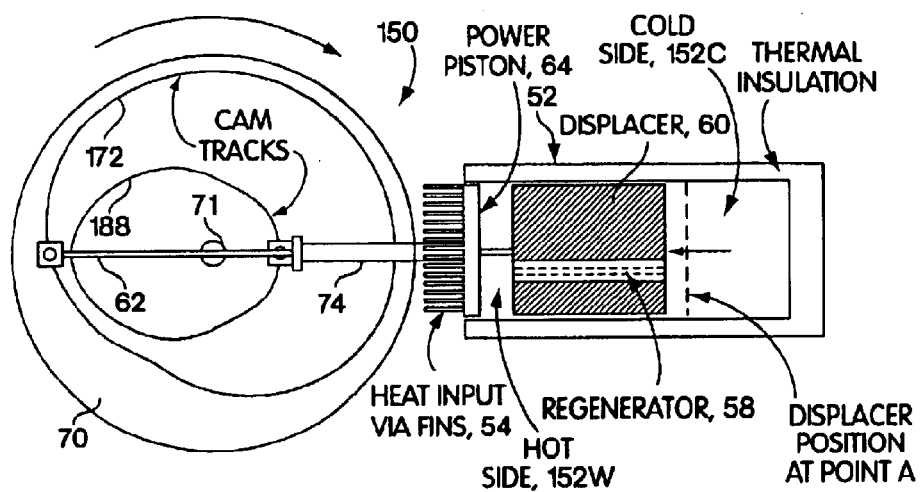
FIG. 5 is a partial cross-section elevation view of a modified first embodiment thermodynamic engine according to the present invention having unity efficiency.

A modified embodiment 150 of the first exemplary embodiment (100) according to the present invention is shown in FIG. 5, and is also composed of isovolumetric, isentropic and isobaric processes, but does not reject any heat in the constant volume process. However, the embodiment 150 of FIG. 5 provides partial excursions of the piston 64 and the displacer 58, and the 'hot' and 'cold' regions of the volume are interchanged.

Like the prior embodiment (100), regeneration between the isovolumetric and isobaric processes recycles more unconverted heat than previously believed possible. Partial displacement results in a larger portion of the extra heat of the Proell Effect to be transferred from the confined gas to the regenerator in the constant Volume cooling process. The transfer of the extra heat is large enough to prepare the gas for isentropic compression to Point C, the lowest temperature of the regenerator, and is large enough to create an internal heat sink to which energy losses may completely flow to and be recovered within the cycle. Moreover, there are no mandatory loss pathways in this embodiment.

As above, the constant volume cooling provided through the regenerator 58 in this embodiment occurs with a greater temperature change in the working fluid than conventionally provided. The Pressure-Enthalpy graph 180B shows point B at a lower temperature than point C, the lowest temperature of the regenerator. Moreover, the heat recycled in the constant volume portion 182A of the cycle beyond the temperature of point C to point B, is greater than all previously known regeneration schemes, allowing the Carnot efficiency limit to be exceeded.

Since the embodiment 150 of FIG. 5 creates an internal heat sink, it is possible to use the heat of the atmosphere, previously believed to be unavailable, to do useful work. Since the internal heat sink in the cold side 152C captures heat influx across the cylinder walls, which is transferred to the regenerator by the action of constant volume cooling (182A, 182B) for use in constant pressure expansion (186A, 186B), a large part of the heat input to the cycle occurs in the cold zone, not across the piston 64.

Figure 6A:
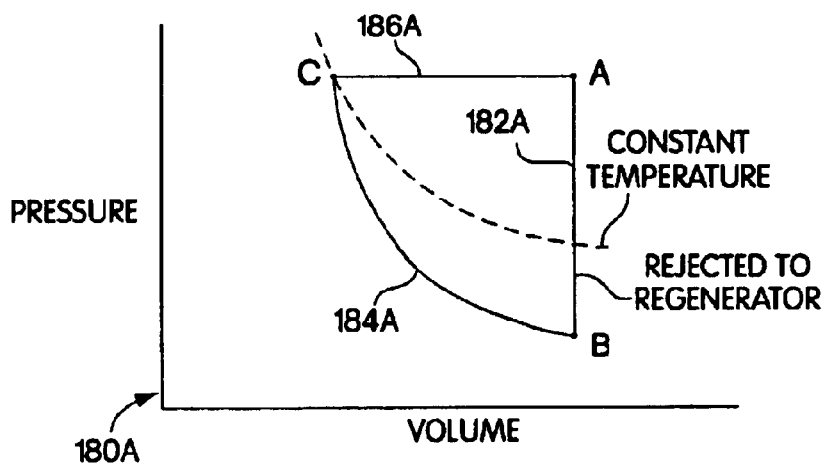
FIGS. 6A and 6B are typical Pressure-Volume and Pressure-Enthalpy graphs of the thermodynamic engine embodiment of FIG. 5.
Figure 6B:
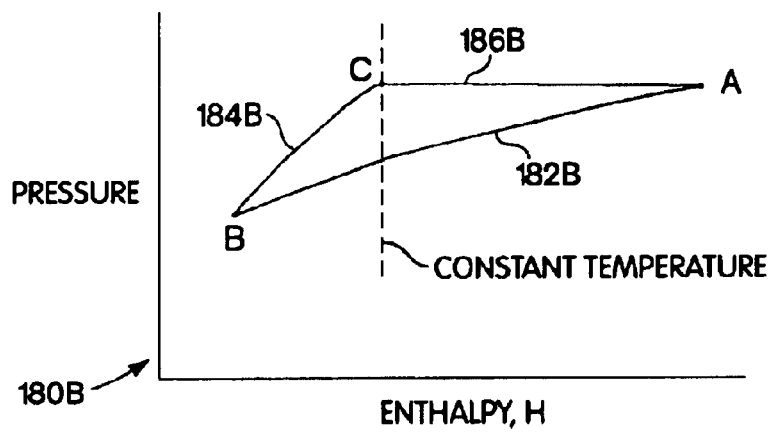
Figure 6C:
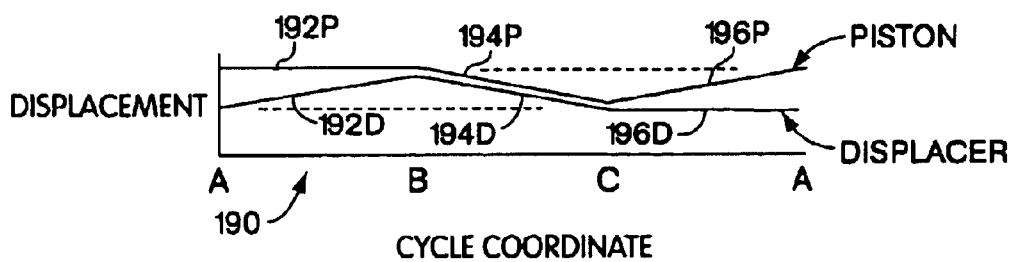
FIG. 6C is a typical Displacement-Time graph of the power piston and fluid displacer cycle motions for the thermodynamic engine embodiment of FIG. 5.

The displacements of the piston 64 and the displacer 60 over the cycle is shown in graph 190 of FIG. 6C by line segments 192P, 194P, 196P, and 192D, 194D, 196D, respectively. The piston 64 and displacer motions are provided by corresponding cam tracks 188 and 172, respectively.

The Pressure-Volume and Pressure-Enthalpy graphs 180A and 180B corresponding to the embodiment 150 of FIG. 5 demonstrate constant volume cooling by traces 182A (also 182B), constant entropy (isentropic) compression by trace 184A (also 184B), and constant pressure expansion by curve traces 186A (also 186B).

Figure 7:
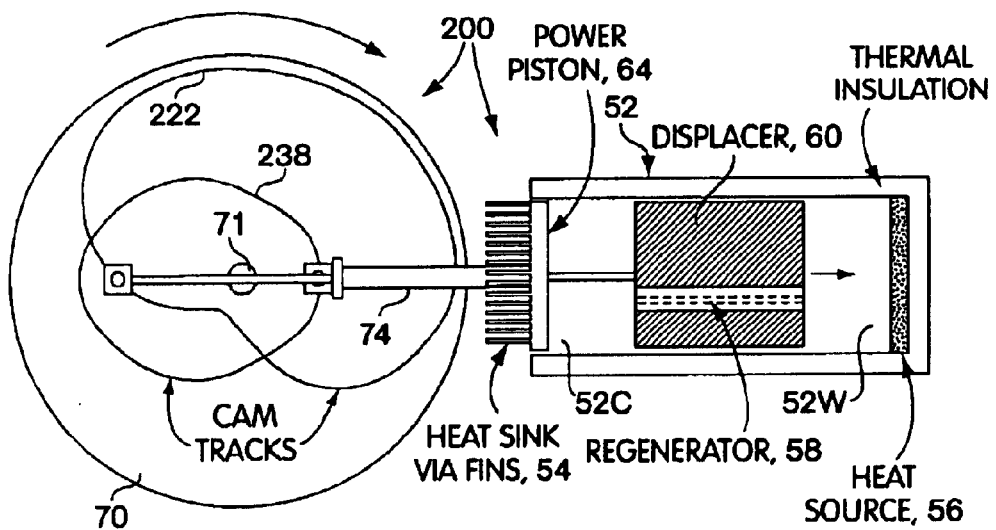
FIG. 7 is a partial cross-section elevation view of a second embodiment thermodynamic engine according to the present invention.

Similar to the first embodiment 100, the third exemplary embodiment 200 according to the present invention is shown in FIG. 7, but introduces an isentropic expansion step at the end of the isobaric expansion step. As with other embodiments of the present invention, the process and apparatus of FIG. 7 recycles more unconverted heat than previously believed possible, and achieves efficiency above Carnot. The constant volume cooling provided through the regenerator 58 in this embodiment occurs with a greater temperature change in the working fluid than conventionally provided. The heat wasted from point C to point D on the graphs 230A and 230B and is not recoverable. Moreover, the heat recycled in the constant volume portion 234A and 234B of the cycle from the temperature of point B to point C, is greater than all previously known regeneration schemes, allowing the Carnot efficiency limit to be exceeded.

The embodiment 200 of FIG. 7 utilizes complete displacement of the working fluid which results in only half of the extra heat being lifted, according to the Proell Effect as previously stated, by pressure-volume work from the gas at constant volume to the regenerator 58. The displacements of the piston 64 and the displacer 60 over the cycle is shown in graph 240 of FIG. 8C by line segments 242P, 244P, 246P, 248P and 242D, 244D, 246D, 248D respectively. The piston 64 and displacer motions are provided by corresponding cam tracks 238 and 222, respectively.

The respective Pressure-Volume and Pressure-Enthalpy graphs 230A and 230B, corresponding to the embodiment 200 of FIG. 7, demonstrate constant volume cooling by traces 234A and 234'A (also 234B and 234'B), constant entropy (isentropic) compression by trace 236A (also 236B), and constant pressure expansion by curve traces 238A and 238'A (also 238B and 238'B).

As the embodiment 100 of FIG. 3, and similarly the further embodiments discussed below, can be modified to provide the alternate embodiment 150, of FIG. 5, so to can the embodiment 200 be modified by the use and apparatus to provide partial displacement of the fluid by the use of a more limited excursion of the piston 64 and the displacer 60. Accordingly, the resulting alternate embodiment, provides a reduced power output. Moreover, more of the thermal energy spontaneously transmitted from the bulk of the fluid (e.g. gas) to the fluid inside the regenerator 58, and therefore to the regenerator 58, comes from the cold side of the displacer. Furthermore, a larger portion of the heat removed to the regenerator 58 from the cold side 152C provides more of the Proell Effect self-refrigeration, thus allowing friction and low temperature heat to be captured in the engine's low temperature internal heat sink, and to be recycled.

Figure 9:
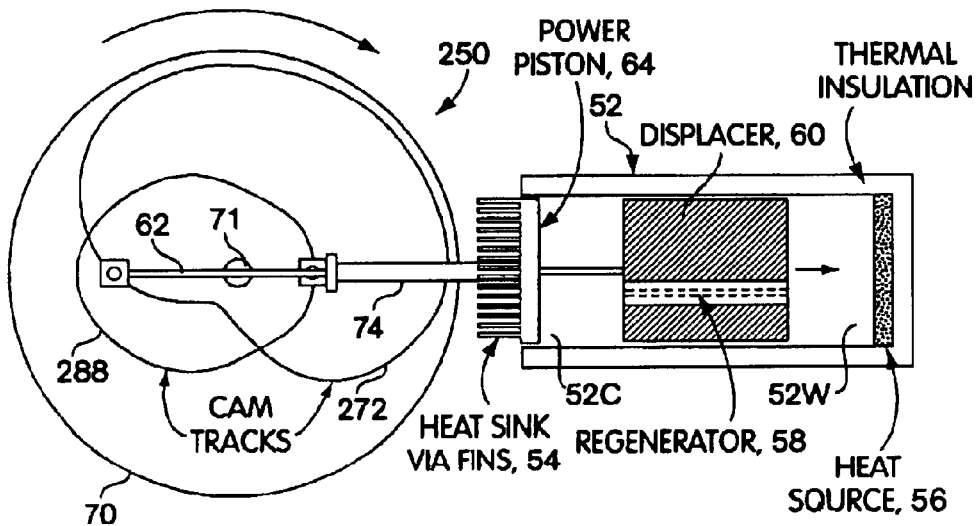
FIG. 9 is a partial cross-section elevation view of a third embodiment thermodynamic engine according to the present invention.

Similar to the third embodiment 200, the fourth exemplary embodiment 250 according to the present invention is shown in FIG. 9, includes an isothermal expansion step at the end of the and isobaric expansion step. As with other embodiments of the present invention, the process and apparatus 250 of FIG. 9 recycles more unconverted heat than previously believed possible, and achieves efficiency above Carnot. The constant volume cooling provided through the regenerator 58 in this embodiment occurs with a greater temperature change in the working fluid than conventionally provided. Heat rejected from point C to point D on the graphs 280A and 280B. Moreover, the heat recycled in the constant volume portion 284A and 284B of the cycle from the temperature of point B to point C, is greater than all previously known regeneration schemes, allowing the Carnot efficiency limit to be exceeded.

Figure 10A:
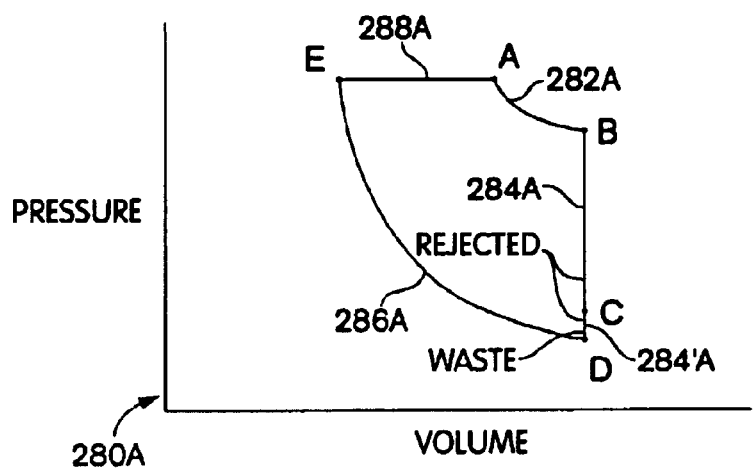
FIGS. 10A and 10B are typical Pressure-Volume and Pressure-Enthalpy graphs of the thermodynamic engine embodiment of FIG. 7.
Figure 10B:
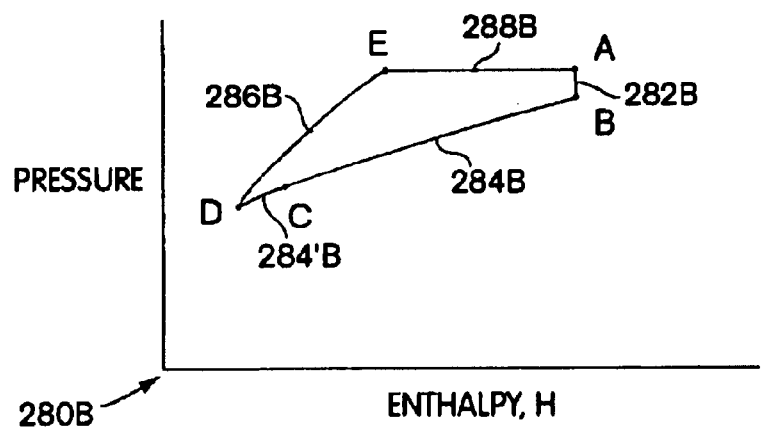
Figure 10C:
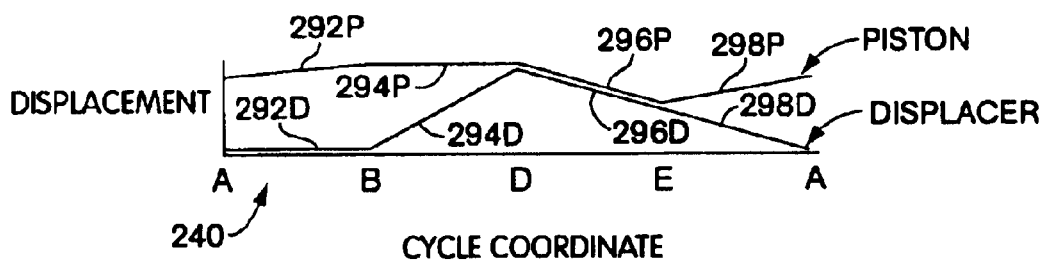
FIG. 10C is a typical Displacement-Time graph of the power piston and fluid displacer cycle motions for the thermodynamic engine embodiment of FIG. 9.

The embodiment 250 of FIG. 9 utilizes complete displacement of the working fluid which results in only half of the extra heat being lifted, according to the Proell Effect as previously stated, by pressure-volume work from the gas at constant volume to the regenerator 58. The displacements of the piston 64 and the displacer 60 over the cycle is shown in graph 290 of FIG. 10C by line segments 292P, 294P, 296P, 298P and 292D, 294D, 296D, 298D respectively. The piston 64 and displacer motions are provided by corresponding cam tracks 288 and 272, respectively.

Figure 8A:
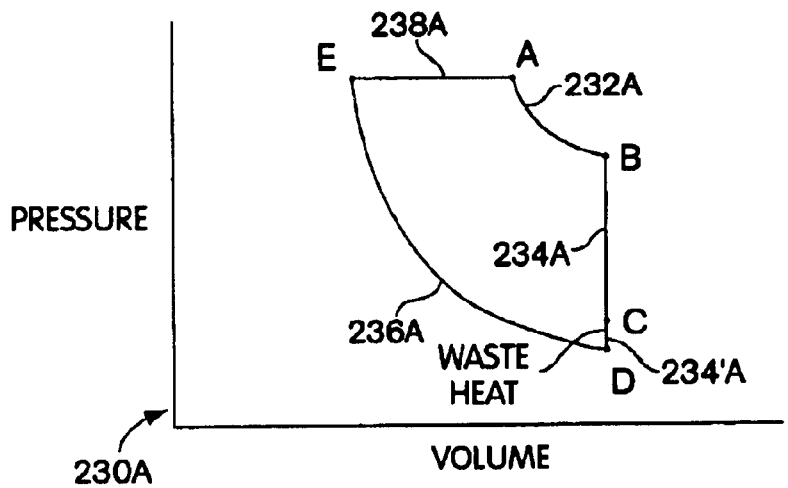
FIGS. 8A and 8B are typical Pressure-Volume and Pressure-Enthalpy graphs of the thermodynamic engine embodiment of FIG. 7.
Figure 8B:
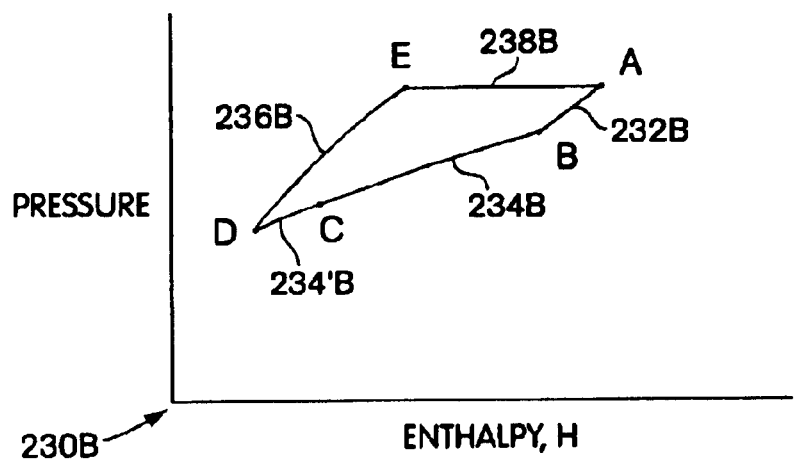
Figure 8C:
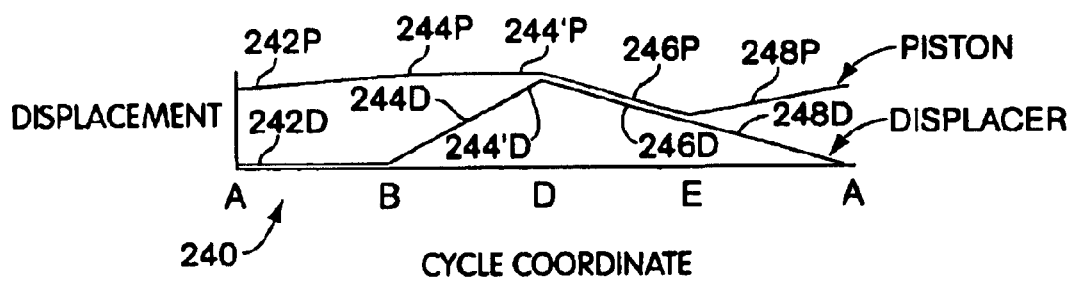
FIG. 8C is a typical Displacement-Time graph of the power piston and fluid displacer cycle motions for the thermodynamic engine embodiment of FIG. 7.

The respective Pressure-Volume and Pressure-Enthalpy graphs 280A and 280B, corresponding to the embodiment 250 of FIG. 9, as with the embodiment 200 of FIG. 7, demonstrate constant volume cooling by traces 284A and 284'A (also 284B and 284'B), constant entropy (isentropic) compression by trace 286A (also 286B), and constant pressure expansion by curve traces 288A (also 288B). However, the constant entropy cycle portion illustrated by segment 232A (and 232B) of FIGS. 8A and 8B is now a constant temperature (isothermal) portion as illustrated by segment 282A (and 282B) of FIGS. 10A and 10B.

Figure 11:
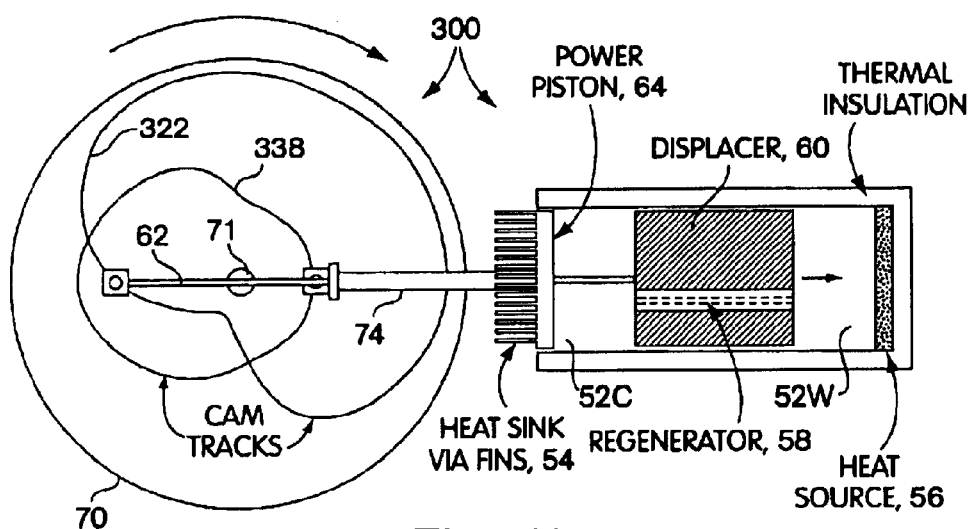
FIG. 11 is a partial cross-section elevation view of a fourth embodiment thermodynamic engine according to the present invention.

The fourth exemplary embodiment 300 according to the present invention is shown in FIG. 11, and is composed of isovolumetric, isentropic, isothermal and isobaric processes respectively, wherein regeneration between the isovolumetric and isobaric processes recycles more unconverted heat than previously believed possible. The constant volume cooling provided through the regenerator 58 in this embodiment occurs with a greater temperature change in the working fluid than conventionally provided. The heat rejected from point C to point D on the graphs 330A and 330B is wasted heat. Moreover, the heat recycled in the constant volume portion 332A of the cycle from the temperature of point A to point B, is greater than all previously known regeneration schemes, allowing the Carnot efficiency limit to be exceeded.

Figure 12A:
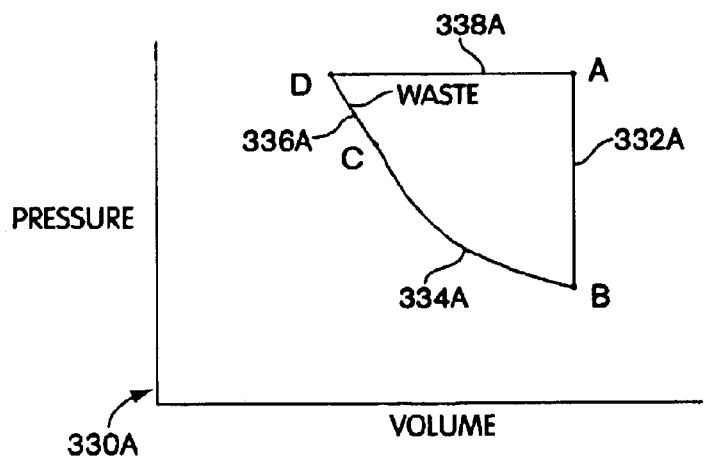
FIGS. 12A and 12B are typical Pressure-Volume and Pressure-Enthalpy graphs of the thermodynamic engine embodiment of FIG. 7.
Figure 12B:
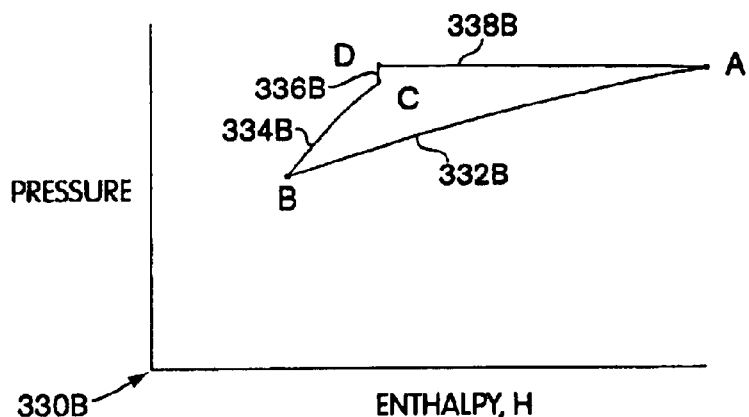
Figure 12C:
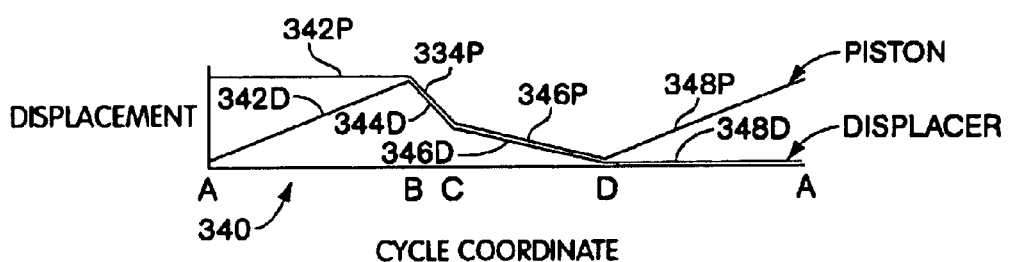
FIG. 12C is a typical Displacement-Time graph of the power piston and fluid displacer cycle motions for the thermodynamic engine embodiment of FIG. 11.

The embodiment 300 of FIG. 11 utilizes complete displacement of the working fluid which results in only half of the extra heat being lifted, according to the Proell Effect as previously stated, by pressure-volume work from the gas at constant volume to the regenerator 58. The displacements of the piston 64 and the displacer 60 over the cycle is shown in graph 340 of FIG. 12C by line segments 342P, 344P, 346P, 348P and 342D, 344D, 346D, 348D respectively. The curve between points B–C of FIG. 12A is constant entropy, and the curve between points C–D of FIG. 12C is constant temperature. The added step indicated by curve segment C–D is to waste heat and thus balance the cycle in reverse sequence of waste and compression than done in the embodiment 100 of FIGS. 4A and 4B, which first wastes heat with a step illustrated by segment B–C, 132A and 132B, above, before the constant entropy compression. The piston 64 and displacer motions are provided by corresponding cam tracks 338 and 322, respectively.

The Pressure-Volume and Pressure-Enthalpy graphs 330A and 330B corresponding to the embodiment 300 of FIG. 11 demonstrate constant volume cooling by traces 332A (also 332B) constant entropy (isentropic) compression by trace 334A (also 334B) constant temperature (isothermal) cooling by trace 336A (also 336B), and constant pressure expansion by curve traces 338A (also 338B). The process and apparatus according to the embodiment 300 of FIG. 11 releases the rejected heat at a higher temperature T than the embodiment 100, above.

Figure 13:
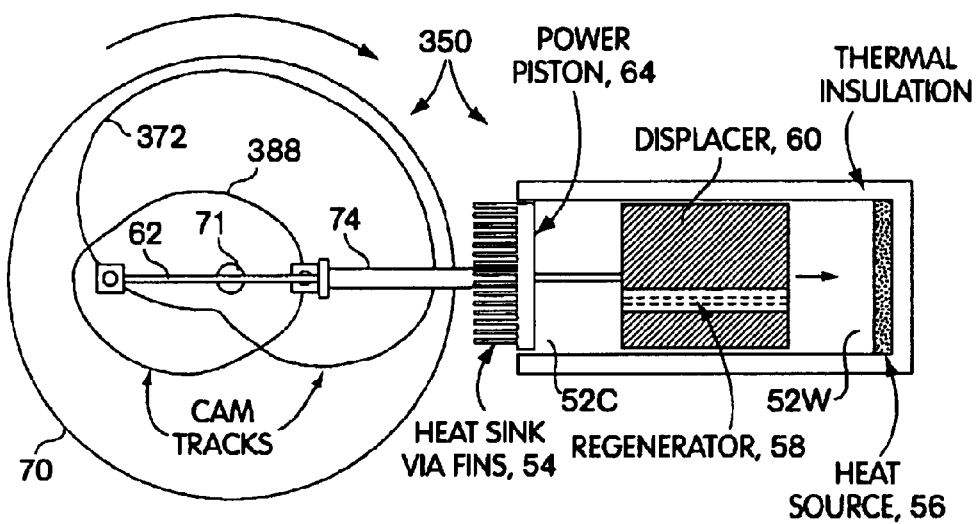
FIG. 13 is a partial cross-section elevation view of a fifth embodiment thermodynamic engine according to the present invention.

The fifth exemplary embodiment 350 according to the present invention is shown in FIG. 13, and is composed of isovolumetric, isothermal, isentropic, and isobaric processes respectively, wherein regeneration between the isovolumetric and isobaric processes recycles more unconverted heat than previously believed possible. The constant volume cooling provided through the regenerator 58 in this embodiment occurs with a greater temperature change in the working fluid than conventionally provided. The heat rejected from point B to point C on the graphs 380A and 380B is wasted heat. Moreover, the heat recycled in the constant volume portion 382A, 382B of the cycle from the temperature of point A to point B, is greater than all previously known regeneration schemes, allowing the Carnot efficiency to be exceeded.

Figure 14A:
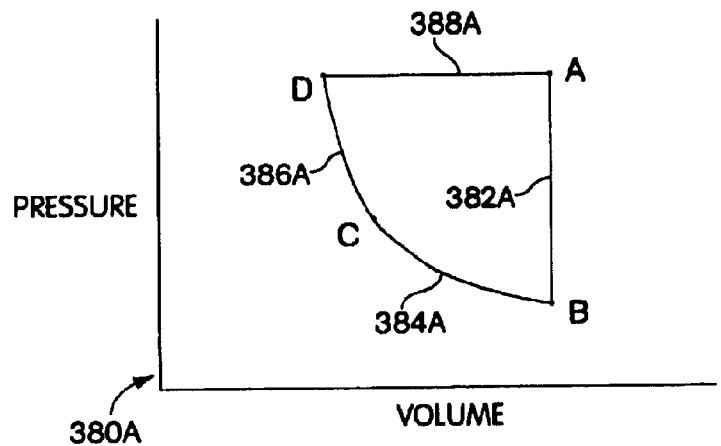
FIGS. 14A and 14B are typical Pressure-Volume and Pressure-Enthalpy graphs of the thermodynamic engine embodiment of FIG. 7.
Figure 14B:
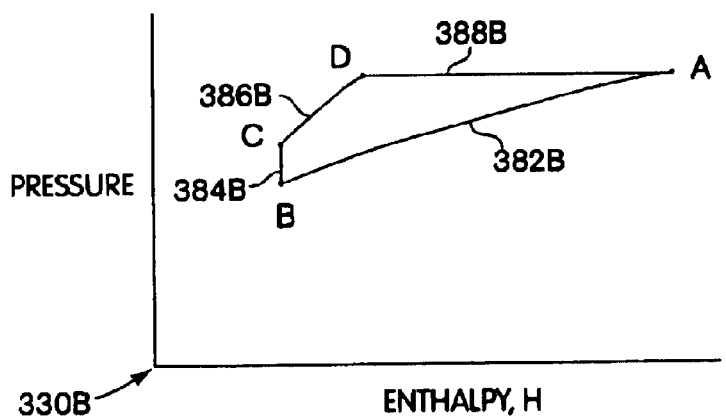
Figure 14C:
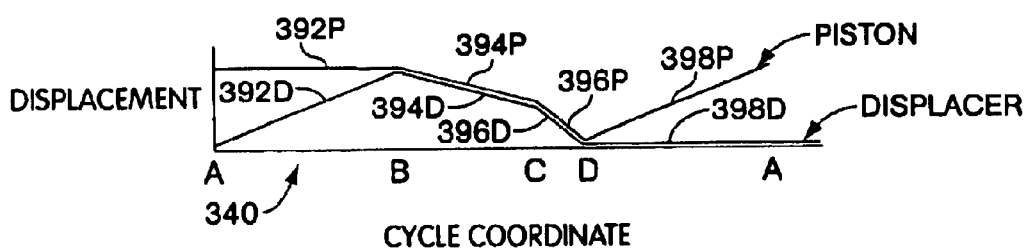
FIG. 14C is a typical Displacement-Time graph of the power piston and fluid displacer cycle motions for the thermodynamic engine embodiment of FIG. 13.

The embodiment 350 of FIG. 13 utilizes complete displacement of the working fluid which results in only half of the extra heat being lifted, according to the Proell Effect as previously stated, by pressure-volume work from the gas at constant volume to the regenerator 58. The displacements of the piston 64 and the displacer 60 over the cycle is shown in graph 390 of FIG. 14C by line segments 392P, 394P, 396P, 398P and 392D, 394D, 396D, 398D respectively. Although the curves between points B–C an C–D of FIG. 14A in FIG. 14C have similar corresponding mechanical motions, the thermal characteristics respective to those curve portions are different, effected in this embodiment by different stroke rates. The piston 64 and displacer motions are provided by corresponding cam tracks 388 and 372, respectively.

The Pressure-Volume and Pressure-Enthalpy graphs 380A and 380B corresponding to the embodiment 350 of FIG. 13 demonstrate constant volume cooling by traces 382A (also 382B) constant temperature (isothermal) compression by trace 384A (also 384B) constant entropy (isentropic) compression by trace 386A (also 386B), and constant pressure expansion by curve traces 388A (also 388B). The process and apparatus according to the embodiment 350 of FIG. 13 releases the rejected heat at a slightly lower temperature T than the embodiment 100, above.

Figure 1:
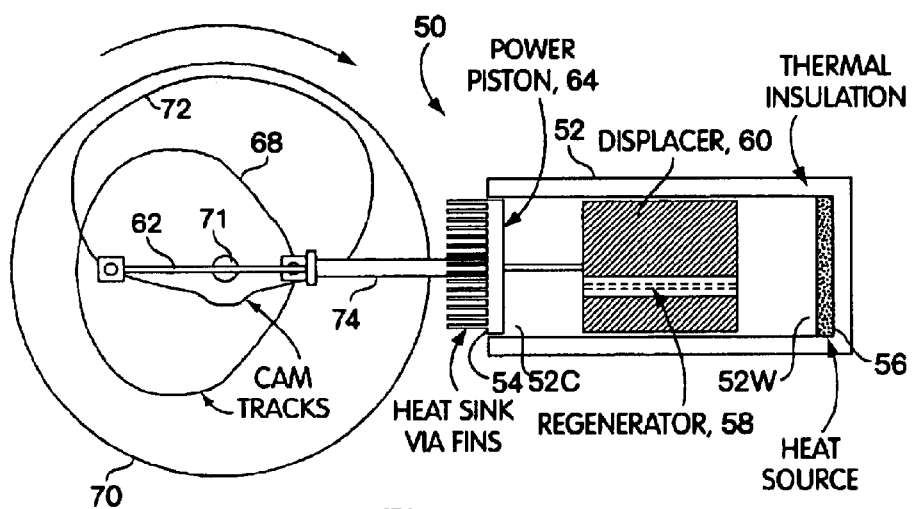
FIG. 1 is a partial cross-section elevation view of a typical Stirling Cycle engine.
Figure 2A:
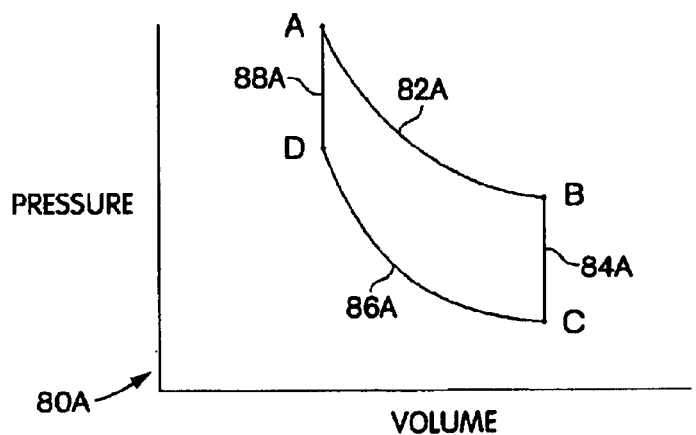
FIGS. 2A and 2B are typical Pressure-Volume and Pressure-Enthalpy graphs of the Stirling Cycle engine of FIG. 1.
Figure 2B:
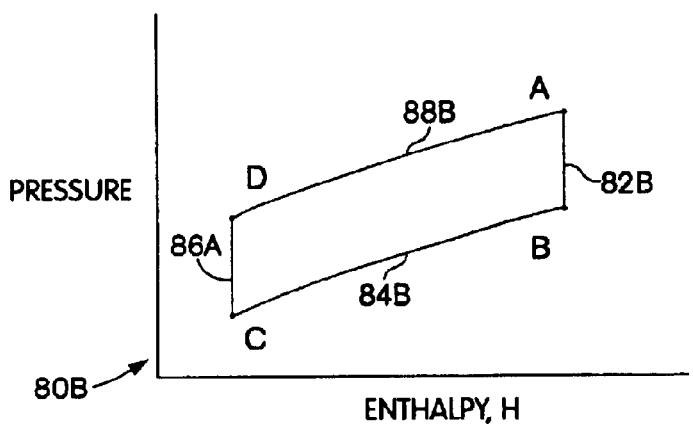
Figure 2C:
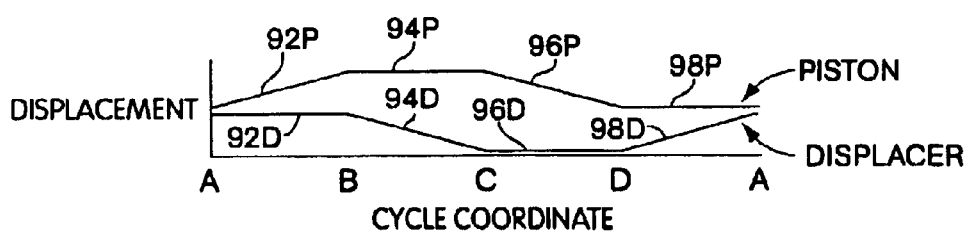
FIG. 2C is a typical Displacement-Time graph of the power piston and fluid displacer cycle motions for the Stirling Cycle engine of FIG. 1.
Figure 15:
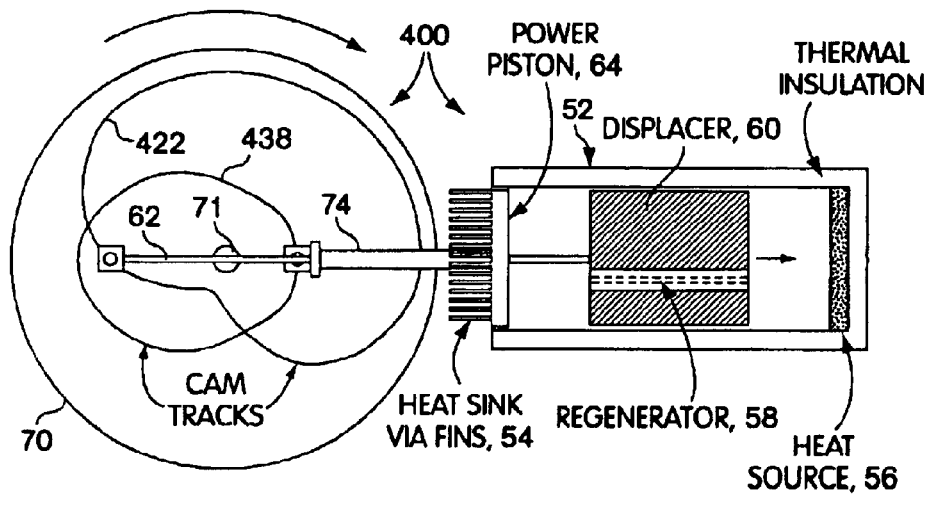
FIG. 15 is a partial cross-section elevation view of a sixth embodiment thermodynamic engine according to the present invention.

The embodiment 400 of FIG. 15 is similar to the embodiment 100 of FIG. 1 which utilizes complete displacement of the working fluid which results in only half of the extra heat being lifted, according to the Proell Effect as previously stated, by pressure-volume work from the gas at constant volume to the regenerator 58. However, in this embodiment (400), an isobaric compression step B–C is used at the end of the displacer cooling stroke A–B, and also provides a cooling effect on the fluid by heat rejection into the regenerator. Moreover, the self-refrigeration cooling according to the Proell Effect in the isovolumetric cooling does not interfere with the isobaric compression which follows; the fluid (gas) in the cold zone remains at the same temperature and the heat removed during the isobaric compression is rejected from the engine via the regenerator without affecting the gas outside the regenerator 58.

Figure 16A:
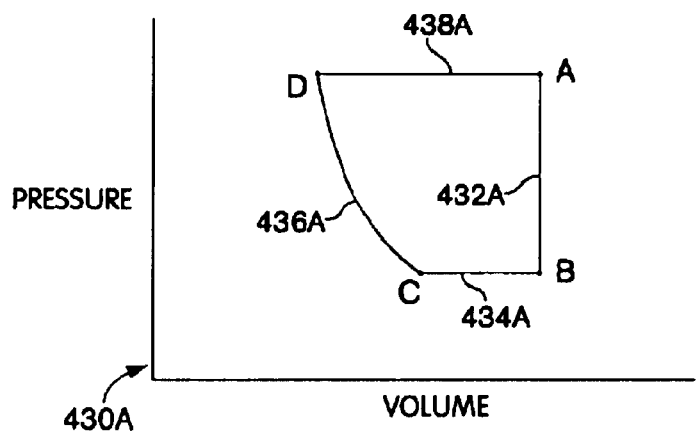
FIGS. 16A and 16B are typical Pressure-Volume and Pressure-Enthalpy graphs of the thermodynamic engine embodiment of FIG. 15.
Figure 16B:
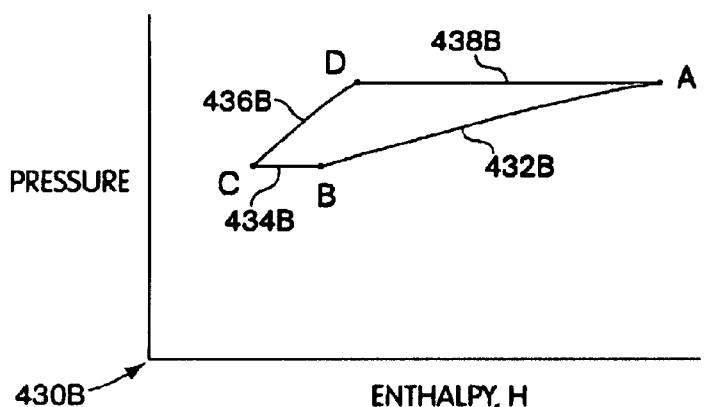
Figure 16C:
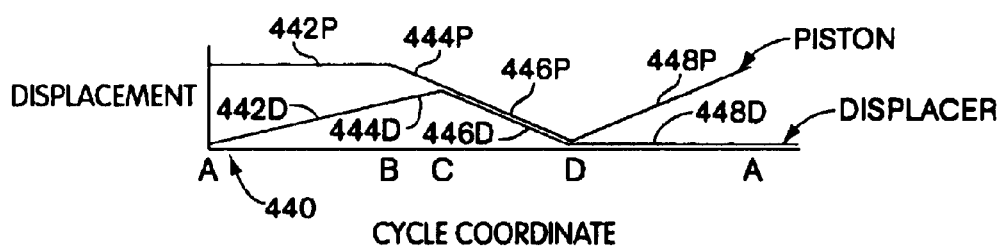
FIG. 16C is a typical Displacement-Time graph of the power piston and fluid displacer cycle motions for the thermodynamic engine embodiment of FIG. 15.

The displacements of the piston 64 and the displacer 60 over the cycle is shown in graph 440 of FIG. 16C by line segments 442P, 444P, 446P, 448P and 442D, 444D, 446D, 448D respectively. The piston 64 and displacer motions are provided by corresponding cam tracks 438 and 422, respectively.

The Pressure-Volume and Pressure-Enthalpy graphs 430A and 430B corresponding to the embodiment 400 of FIG. 15 demonstrate constant volume cooling by trace 432A (also 432B), constant pressure (isobaric) compression by trace 434A (and 434B), constant entropy (isentropic) compression by trace 436A (also 436B), and constant pressure expansion by curve trace 438A (also 438B).

Further embodiments and modifications of the embodiments illustrated above are included within the scope of the present invention. Also included are alternate embodiments of the structures and processes shown and discussed above which incorporate partial displacement of the fluid and embodiments which additionally incorporate heat rejection to further improve efficiency. Moreover, novel cycles according to the present invention having additional cycle steps (e.g. five steps or more) are also included within the scope of the present invention.

What is claimed is:

1. A Thermodynamic Engine comprising:

a volumetric container;

a fluid contained within said volumetric container;

a piston disposed within said volumetric container and adapted to selectively decrease the volume and increase the pressure therein;

a volumetric displacer disposed within said volumetric container as volumetrically defined by said piston to form a first and a second portion thereof, said volumetric displacer being operable to increase and decrease the volume of at least one of said first and said second portion, wherein said fluid in said first portion is at least initially at a first temperature T1, and said fluid in said second portion is at least initially at a second temperature T2 lower than T1;

a heat regenerator having reversible input and output ports, one of which communicating with said first portion and the second of which communicating with said second portion wherein the temperature of said fluid when flowing from said first portion is lowered toward T2 and the temperature of said fluid when flowing from said second portion is raised toward T1; and a cyclical linkage operable to repeatable and controllably move said piston through a range to provide a volumetric variation of said volumetric container according to a first sequence moving said displacer throughout a range of motion wherein said fluid is moved between said first and second portion via said heat regenerator according to a second sequence, wherein said first sequence comprises an order of piston motions selected from reducing said container volume, increasing said container volume, and maintaining said container volume, and said second sequence comprises an order of regenerator motions selected from moving said fluid from the warm side of said container volume to said cold side, moving said fluid from the cold side of said container volume to said warm side, and maintaining a stationary relative position in said container volume, said second sequence being different in motion from said first sequence, wherein said cyclical linkage includes means operable according to a first phase for moving first portion fluid initially at temperature T1 through said heat regenerator to said second portion initially at T2 such that the sum of the volume of said first and said second portion is substantially constant, said linkage also including means operable according to a second phase for moving said piston to diminish the volume of said second portion at a constant entropy and diminish the volume of said volumetric container, and said linkage further including means operable according to a third phase to increase the volume of said volumetric container and displace said fluid from said second portion to said first portion at a constant pressure to provide a net Work output over said first, second and third phases, and wherein all heat is rejected to said regenerator during said first, constant volume phase.

2. The Thermodynamic Heat Engine of claim 1, wherein some heat is wasted during said first, constant volume phase.

3. The Thermodynamic Heat Engine of claim 1, wherein said cyclical linkage includes means operable according to an additional phase between said first phase and said second phase, wherein said linkage also includes means for moving said fluid from said first portion to said second portion through said displacer means while said piston is isobarically decreasing said volumetric container volume after said first phase.

4. A Thermodynamic Engine comprising:

a volumetric container;

a fluid contained within said volumetric container;

a piston disposed within said volumetric container and adapted to selectively decrease the volume and increase the pressure therein;

a volumetric displacer disposed within said volumetric container as volumetrically defined by said piston to form a first and a second portion thereof, said volumetric displacer being operable to increase and decrease the volume of at least one of said first and said second portion, wherein said fluid in said first portion is at least initially at a first temperature T1, and said fluid in said second portion is at least initially at a second temperature T2 lower than T1;

a heat regenerator having reversible input and output ports, one of which communicating with said first portion and the second of which communicating with said second portion wherein the temperature of said fluid when flowing from said first portion is lowered toward T2 and the temperature of said fluid when flowing from said second portion is raised toward T1; and a cyclical linkage operable to repeatable and controllably move said piston through a range to provide a volumetric variation of said volumetric container according to a first sequence moving said displacer throughout a range of motion wherein said fluid is moved between said first and second portion via said heat regenerator according to a second sequence, wherein said first sequence comprises an order of piston motions selected from reducing said container volume, increasing said container volume, and maintaining said container volume, and said second sequence comprises an order of regenerator motions selected from moving said fluid from the warm side of said container volume to said cold side, moving said fluid from the cold side of said container volume to said warm side, and maintaining a stationary relative position in said container volume, said second sequence being different in motion from said first sequence, wherein said cyclical linkage includes means for moving said piston to expand said first portion volume substantially more than said second portion volume according to a first phase, said linkage also including means operable according to a second phase to move said first portion fluid initially at temperature T1 through said heat regenerator to said second portion initially at T2 such that the sum of the volume of said first and said second portion is substantially constant, said linkage further including means operable according to a third phase for moving said displacer and said piston to diminish the volume of said second portion at a constant entropy and diminish the volume of said volumetric container, and said linkage including means operable according to a fourth phase for increasing the volume of said volumetric container and displace said fluid from said second portion to said first portion at a constant pressure to provide a net Work output over said first, second, third and fourth phases.

5. The Thermodynamic Heat Engine of claim 4, wherein said cyclical linkage comprises means for moving said displacer to recover all heat in said second phase.

6. The Thermodynamic Heat Engine of claim 4, wherein said cyclical linkage comprises means moving said displacer to waste some heat in said second phase.

7. The Thermodynamic Heat Engine of claim 4 wherein said cyclical linkage comprises means for moving said piston to isentropically expand said volumetric container.

8. The Thermodynamic Heat Engine of claim 5 wherein said cyclical linkage comprises means for moving said piston to isothermally expand said volumetric container during said first phase.

9. The Thermodynamic Heat Engine of claim 8, wherein said cyclical linkage comprises means for moving said regenerator to recover all heat in said second phase.

10. The Thermodynamic Heat Engine of claim 8, wherein said cyclical linkage comprises means for moving said displacer to waste some heat in said second phase.

11. The Thermodynamic Heat Engine of claim 1, wherein, said cyclical linkage includes means operable according to a first phase for moving first portion fluid initially at temperature T1 through said heat regenerator to said second portion initially at T2 such that the sum of the volume of said first and said second portion is substantially constant, said linkage including means operable according to a second phase for moving said displacer and said piston to diminish the volume of said second portion at a constant entropy and diminish the volume of said volumetric container, said linkage further including means operable according to a third phase for moving said displacer and said piston to further diminish the volume of said second portion at a constant temperature and further diminish the volume of said volumetric container, and said linkage including means operable according to a fourth phase for increasing the volume of said volumetric container and displace said fluid from said second portion to said first portion at a constant pressure to provide a net Work output over said first, second, third and fourth phases.

12. The Thermodynamic Heat Engine of claim 1, wherein, said cyclical linkage includes means operable according to a first phase for moving first portion fluid initially at temperature T1 through said heat displacer to said second portion initially at T2 such that the sum of the volume of said first and said second portion is substantially constant, said linkage also including means operable according to a second phase for moving said displacer and said piston to diminish the volume of said second portion at a constant temperature and diminish the volume of said volumetric container, said linkage further includes means operable according to a third phase for moving said displacer and said piston to further diminish the volume of said second portion at a constant entropy and further diminish the volume of said volumetric container, and said linkage includes means operable according to a fourth phase increasing the volume of said volumetric container and displace said fluid from said second portion to said first portion at a constant pressure to provide a net work output over said first, second, third and fourth phases.

13. The Thermodynamic Heat Engine of claim 1, wherein said regenerator is disposed in said displacer and movable therewith.

14. A Thermodynamic Heat Engine comprising:

a volumetric container;

a fluid contained within said volumetric container;

a piston disposed within said volumetric container and adapted to selectively decrease the internal volume thereof;

a volumetric displacer disposed within said volumetric container as volumetrically defined by said piston to form a first and a second portion therein, said volumetric displacer being operable to increase and decrease the volume of at least one of said first and said second portion, wherein said fluid in said first portion is at least initially at a first temperature T1, and said fluid in said second portion is at least initially at a second temperature T2 lower than T1;

a heat regenerator having reversible input and output ports, one of which communicating with said first portion and the second of which communicating with said second portion wherein the temperature of said fluid when flowing from said first portion is lowered toward T2 and the temperature of said fluid when flowing from said second portion is raised toward T1; and a cyclical linkage operable to periodically and controllably move said piston through a range to provide a volumetric variation of said volumetric container according to a motion of complexity greater than a sinusoidal motion of period equal to said piston period.

15. The Thermodynamic Heat Engine of claim 14, wherein said cyclical linkage includes means for providing a periodically stationary position of said piston for a selected time interval.

16. The thermodynamic Engine of claim 15, further comprising
    a displacer cyclical linkage operable to paretically and controllably move said displacer through a range of motion within said volumetric container according to an eccentric motion having a motion complexity greater than a sinusoidal motion of period equal to said piston period.

17. The Thermodynamic Heat Engine of claim 16, wherein said displacer cyclical linkage includes means for providing a periodically stationary position of said piston for a selected time interval.

18. The Thermodynamic Heat Engine of claim 14, wherein said regenerator is disposed in said displacer and movable therewith.

19. A method of providing work output from a Thermodynamic Heat Engine including a volumetric container having a warm region and a cold region therein, a selectively movable fluid displacer therein for selectively dividing the volume of said volumetric container into a warm and a cold portion corresponding to said warm and said cold region, a regenerator communicating with said warm and said cold region, a piston disposed to selectively vary the total volume of said volumetric container, comprising the steps of:
    cyclically and controllably moving said piston through a range of motion to provide a volumetric variation of said volumetric container according to a first sequence, wherein
        said first sequence comprises an order of piston motions selected from reducing said container volume, increasing said container volume, and maintaining said container volume, wherein said steps of controllably moving said piston and said displacer comprises the steps of:
            moving said fluid in said first portion through said regenerator to said second portion such that the sum of the volume of said first and said second portion is substantially constant;
            isentropically diminishing the volume of said volumetric container by said piston;
            expanding the volume of said volumetric container by said piston at a constant pressure, wherein heat is released from said regenerator.

20. The method of claim 19, wherein said step of moving at a constant sum volume includes wasting heat.

21. The method of claim 20, after said step of further including the step of moving said fluid, the step of:
    moving said fluid from said first portion to said second portion through said displacer including the step of isobarically decreasing said volumetric container volume by said piston.

22. The method of claim 19, wherein said steps of controllably moving said piston and said displacer comprises the steps of:
    expanding said first portion volume while diminishing said second portion volume for a net volume increase of said first and said second portion volumes;
    moving said fluid from said first portion through said heat regenerator to said second portion such that the volume of said first and second portion is substantially constant; and
    isentropically diminishing the volume of said first portion and said volumetric container.

23. The method of claim 22, wherein said step of moving said fluid includes the step of recovering all heat into said regenerator.

24. The method of claim 23, wherein said step of moving said fluid includes the step of wasting heat.

25. The method of claim 22 further includes the step of isentropically expanding the volume of said volumetric container after said step of expanding.

26. The method of claim 23, further including the step of isothermally expanding the volume of said volumetric container after said step of expanding.

27. The method of claim 19, further including the step of:
    moving said displacer throughout a range of motion according to a second sequence wherein said fluid is moved between said first and second portion viq said heat regenerator according to said second sequence, wherein
        said second sequence comprises an order of regenerator motions selected from moving said fluid from the warm side of said container volume to said cold side, moving said fluid from the cold side of said container volume to said warm side, and providing a displacer position in said container volume having substantially the same proportion of said first and said second portions, said second sequence being different from said first sequence.

28. The method of claim 27, wherein said step of moving said fluid includes the step of recovering all heat into said regenerator.

29. The method of claim 28, wherein said step of moving said fluid includes the step of wasting heat.

30. The method of claim 19, wherein said steps of controllably moving said piston and said displacer comprises the steps of:
    moving said fluid from said first portion through said heat regenerator to said second portion such that the volume of said first and second portion is substantially constant;
    partially diminishing the volume of said second portion and said volumetric container at a constant entropy;
    isothermally diminishing the volume of said second portion and said volumetric container; and
    isobarically expanding said second portion volume substantially and said volumetric container volume.

31. The method of claim 19, wherein said steps of controllably moving said piston and said displacer comprise the steps of:
    moving said fluid from said first portion through said heat regenerator to said second portion such that the volume of said first and second portion is substantially constant;
    partially diminishing the volume of said second portion and said volumetric container at a constant temperature;
    diminishing the volume of said second portion and said volumetric container at a constant entropy; and
    isobarically expanding said second portion volume substantially and said volumetric container volume.

32. A method of providing work output from a Thermodynamic Heat Engine including a volumetric container having a warm region and a cold region therein, a selectively movable fluid displacer including a regenerator therein for selectively dividing the volume of said volumetric container into a warm and a cold portion corresponding to said warm and said cold region, a piston disposed to selectively vary the total volume of said volumetric container, comprising the steps of:

repeatably and controllably moving said piston through a range of motion to provide a volumetric variation of said volumetric container according to a first sequence, wherein said first sequence comprises an order of piston motions having motion harmonics greater than the inverse of the period of said first sequence, further including the step of repeatably and controllably moving said displacer through a range of motion to provide a displacement of said fluid between said first and second portions of said volumetric container according to a first sequence, wherein said second sequence comprises an order of piston motions having motion harmonics greater than the inverse of the period of said first sequence.

33. The method of claim 32, wherein said step of moving said piston includes the step of interrupting the motion of said piston for a selected time interval.

34. The method of claim 32, wherein the step of moving said displacer comprises the step of:

moving said displacer according to motions selected from moving said fluid from the warm side of said container volume to said cold side, moving said fluid from the cold side of said container volume to said warm side, and providing a displacer position in said container volume having substantially the same proportion of said first and said second portions, said second sequence motions being greater than the fundamental harmonic period.

35. A Thermodynamic Heat Engine comprising:

a volumetric container;

a fluid contained within said volumetric container;

a piston disposed within said volumetric container and adapted to selectively decrease the volume and increase the pressure therein;

a volumetric displacer disposed within said volumetric container as volumetrically defined by said piston to form a first and a second portion thereof, said volumetric displacer being operable to increase and decrease the volume of at least one of said first and said second portion, wherein said fluid in said first portion is at least initially at a first temperature T1, and said fluid in said second portion is at least initially at a second temperature T2 lower than T1;

a heat regenerator having reversible input and output ports, one of which communicating with said first portion and the second of which communicating with said second portion wherein the temperature of said fluid when flowing from said first portion is lowered toward T2 and the temperature of said fluid when flowing from said second portion is raised toward T1; and a cyclical linkage operable to repeatably and controllably move said piston through a range to provide a volumetric variation of said volumetric container according to a first sequence moving said displacer throughout a range of motion wherein said fluid is moved between said first and second portion via said heat regenerator according to a second sequence, wherein said first sequence comprises an order of piston motions selected from reducing said container volume, increasing said container volume, and maintaining said container volume, and said second sequence comprises an order of regenerator motions selected from moving said fluid from the warm side of said container volume to said cold side, moving said fluid from the cold side of said container volume to said warm side, and maintaining a stationary relative position in said container volume, said second sequence being different in motion from said first sequence, further including means for providing regenerator motions to include at least one of isovolumetric cooling and isobaric expansion.

36. A method of providing work output from a Thermodynamic Heat Engine including a volumetric container having a warm region and a cold region therein, a selectively movable fluid displacer therein for selectively dividing the volume of said volumetric container into a warm and a cold portion corresponding to said warm and said cold region, a regenerator communicating with said warm and said cold region, a piston disposed to selectively vary the total volume of said volumetric container, comprising the steps of:

cyclically and controllably moving said piston through a range of motion to provide a volumetric variation of said volumetric container according to a first sequence, wherein said first sequence comprises an order of piston motions selected from reducing said container volume, increasing said container volume, and maintaining said container volume; and isovolmetrically cooling and.isobarically expanding a fluid via said regenerator.

* * * * *